United States Patent [19]

Matsumura

[11] Patent Number: 4,484,072
[45] Date of Patent: Nov. 20, 1984

[54] DEVICE FOR DETECTING A PORTION OF LIGHT INCIDENT ON AN IMAGE FORMING OPTICAL SYSTEM

[75] Inventor: Susumu Matsumura, Kawasaki, Japan

[73] Assignee: Canon Kabushiki Kaisha, Tokyo, Japan

[21] Appl. No.: 472,649

[22] Filed: Mar. 11, 1983

Related U.S. Application Data

[63] Continuation of Ser. No. 285,921, Jul. 23, 1981, abandoned, which is a continuation of Ser. No. 114,201, Jan. 22, 1980, abandoned.

[30] Foreign Application Priority Data

Jan. 31, 1979 [JP] Japan ................... 54-10190

[51] Int. Cl.³ .............................................. H01J 3/14
[52] U.S. Cl. ......................... 250/237 G; 350/162.22; 350/162.23
[58] Field of Search ........... 250/201, 204, 216, 237 R, 250/237 G, 550; 350/162.11, 162.12, 162.16, 162.17, 162.22, 162.23; 356/354; 354/23 R, 59

[56] References Cited

U.S. PATENT DOCUMENTS 4,129,382 12/1978 Greenaway ....................... 250/550
4,174,894 11/1979 Fukuhara et al. .................. 354/59
4,215,924 8/1980 Matsumoto ......................... 354/59
4,222,633 9/1980 Hock .............................. 350/162.17

*Primary Examiner*—David C. Nelms
*Attorney, Agent, or Firm*—Fitzpatrick, Cella, Harper & Scinto

[57] ABSTRACT

Disclosed is a device for splitting incident light on an image forming optical system by means of a relief type diffraction lattice and for detecting a portion of the light. The device is constructed with a transparent substrate, on one surface of which there is formed the relief type diffraction lattice which satisfies the condition of $N\lambda \simeq 2n\Delta$ (where N is an integer; $\lambda$ is a wavelength contained in the incident light; n denotes a refractive index of the transparent substrate; and $\Delta$ represents a quantity between peak and valley on the surface of the relief type diffraction lattice), a reflective film coated on the lattice surface, a transparent filling layer having the substantially same refractive index as that of the transparent substrate, which perfectly fills the peak and valley (or surface irregularity) of the relief type diffraction lattice, and light detectors. With this construction, the incident light is split by diffraction without undesirably effecting the image-formation, and the thus diffracted light is detected by the light detectors.

8 Claims, 16 Drawing Figures

DEVICE FOR DETECTING A PORTION OF LIGHT INCIDENT ON AN IMAGE FORMING OPTICAL SYSTEM

This application is a continuation of application Ser. No. 285,921 filed July 23, 1981, now abandoned, which in turn is a continuation application of U.S. Ser. No. 114,201, filed Jan. 22, 1980, now abandoned.

BACKGROUND OF THE INVENTION

1. Field of the Invention

This invention relates to a device for splitting a light beam by means of a diffraction lattice (or grating) and for detecting a portion of the light. More particularly, the invention is concerned with such a device adaptable to a light metering device in a photographic camera.

2. Description of the Prior Art

The light metering device in a photographic camera splits a portion of an image-forming light beam which has passed through an object lens by a beam splitter, and the thus split light is detected by a light detector. For a light beam splitter useful for such a light metering device, there has so far been used a single half mirror which is obliquely provided in the camera. Such a beam splitting device for use in the camera, etc. should desirably be as thin as possible. U.S. Pat. No. 3,464,337 discloses a device, in which two pieces of members, each being provided on its surface with a plurality of slanted reflective surfaces, are cemented together to form a prismatic line raster, and a part of the incident light is split in a geometrical-optics manner for light metering.

The present invention is to provide such detecting device having a beam splitter of much thinner thickness by use of a diffraction lattice (or grating) having a small pitch of 10 μm or so.

In the beam splitter to split light using such a diffraction lattice, it is desired that no useless diffracted light should occur, except for an image forming light beam emitted from the diffraction lattice and diffracted light of a particular order for light metering, because such useless diffracted light is harmful to image formation of an object due to flare light or ghost image caused or created thereby.

A beam splitter which has solved such problems is disclosed in the laid-open Japanese patent application No. 53-42042 filed by the assignee-to-be of the present application. The light beam splitter disclosed in this laid-open application uses a relief type diffraction lattice. (A diffraction lattice, on one surface of which a plurality of peak-and-valley structures are regularly formed, is usually called a "relief type diffraction lattice".) The beam splitter as disclosed in the above-mentioned application particularly uses a blazed diffraction lattice, one of the various types of relief diffraction lattices, having such a characteristic that it diffracts almost all quantity of the incident light in one specific diffraction order, whereby more than 90% of the diffraction efficiency of a zero order transmissively diffracted light for the image formation of an object, a few percent of the diffraction efficiency of the primary order diffracted light is available for light metering, and substantially all of the diffraction efficiency of other orders are rendered zero. The reason for using the primary order diffracted light as the light metering diffracted light is that, as described in the laid-open specification, it is difficult for the type of blazed diffraction lattice known at present to increase the diffraction efficiency of two diffracted lights, the diffraction order numbers of which are not adjacent each other, in comparison with the other diffracted lights.

Generally, when a light is to be split in the direction of a diffraction angle $\theta$ using a diffraction lattice having a pitch d, the following relationship is established between the pitch d and the diffraction angle $\theta$ of N-order.

$$d \sin \theta = N\lambda \qquad (1)$$

($\lambda$ is a wavelength of incident light)

As will be readily understandable from the above equation, the lower the order number N of the diffracted light for use in the light metering becomes, the smaller become the diffraction angle $\theta$ and the pitch d. However, the diffraction angle $\theta$ should be at a certain definite value or above, e.g., 30° or so. On account of this, when a diffracted light for light metering having the diffraction angle $\theta$ of 30° and the wavelength $\lambda$ of incident light of 0.55 μm is to be split by means of the beam splitter as shown in the embodiment of the abovementioned laid-open patent application No. 53-42042, for example, wherein the zero order transmissively diffracted light and the primary order diffracted light are used as the image-forming light and the light metering diffracted light (N=1), the pitch d of the diffraction lattice is calculated from the above equation (1) as 1.1 μm, which means that a very fine pitch should be provided on the diffraction lattice.

A diffraction lattice having such fine pitch requires precision manufacturing in the production of a "master" diffraction lattice to be the base and "copy" diffraction lattices causing undesirable increases in the cost of mass-production.

In order therefore to relax the conditions imposed on such a diffraction lattice and to obtain a beam splitter which is easy to manufacture, it has been desired that a diffraction lattice capable of using a high order diffracted light for the light metering be provided.

SUMMARY OF THE INVENTION

It is an object of the present invention to provide a device for detecting a portion of incident light and having a very thin beam splitting means.

The present invention attains this object by use of a regularly arranged structure of a very fine pitch, i.e., a diffraction lattice, as the beam splitter means. However, in the diffraction lattice of a general type, many of the diffracted lights are emitted in different directions, as mentioned above.

It is another object of the present invention to provide a device for detecting a portion of incident light using a diffraction lattice, in which diffracted light of a specific order number, except for the zero order transmitting light (image forming light), generates at a larger angle than the incident light and at a high diffraction efficiency without generating diffracted light of other order numbers.

It is still another object of the present invention to provide a device for detecting a portion of incident light using a diffraction lattice which is easy to manufacture.

The beam splitting means to be used for the device according to the present invention attains the abovementioned objects by the following construction. That is, the relief type diffraction lattice of fine pitch is formed on one surface of a transparent substrate. This relief type diffraction lattice satisfies the diffraction condition of $2n\Delta = N\lambda$ (where n denotes a refractive index of the transparent substrate; Δ represents an amount of difference of quantity between peak and valley (surface irregularity) of the relief type diffraction lattice; N is an integer; and λ denotes a wavelength contained in incident light). Next, the irregular surface (i.e., peaks and valleys) of the relief type diffraction lattice is perfectly filled by a transparent filter having substantially the same refractive index as that of the transparent substrate.

By this improvement in the relief type diffraction lattice, a very thin beam splitter can be obtained, and such a beam splitter can be readily manufactured and is capable of taking out only the diffracted light of a high order number as the split light.

DETAILED DESCRIPTION OF PREFERRED EMBODIMENTS

A first embodiment of the present invention shows a beam splitter which is suitable for splitting light beam for light metering from image forming light, the beam splitter being disposed in an image forming optical system such as camera, and so forth. In this embodiment, since the zero order transmissively diffracted light is used as the image forming light beam with respect to light which projects into the beam splitter, it is necessary that the quantity of this zero order transmissively diffracted light be at a certain value or higher, e.g., 90% or above. Accordingly, the relief type diffraction lattice used in the beam splitter of this embodiment should possess its zero order transmissive diffraction efficiency of 90% and above, and also an N-order transmissive or reflective diffraction efficiency of a few percent as the light beam for light metering.

In general, a part of the incident light is reflected in the geometrically positive reflecting direction on a semi-reflective surface which is slanted. However, the reflected light from the diffraction lattice of very fine pitch of from several tens to a few μm or so, which is used for thinning the beam splitter, includes a plurality of diffracted lights which are projected in mutually different directions by the diffracting phenomenon, so that a single split light is difficult to obtain. The relief type diffraction lattice used in the present invention has eliminated the abovementioned defects by imposing on the diffraction lattice such a condition that only the diffracted light of a single specific order number may possess a very high diffraction efficiency.

Now, referring to FIG. 1, explanations will be made as to the diffraction characteristic of the relief type (particularly, the blazed type) diffraction lattice.

Figure 1:
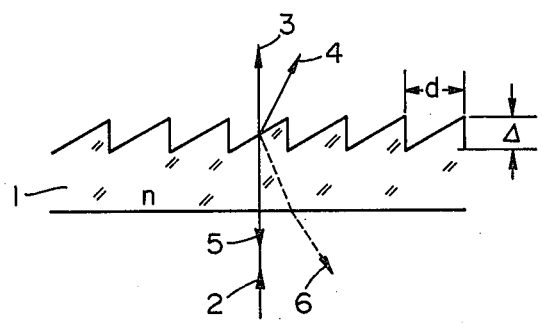
FIG. 1 is a cross-sectional view of a relief type diffraction lattice.

In FIG. 1, a reference numeral 1 designates a blazed type diffraction lattice constructed with a transparent substrate having a refractive index n and a saw-toothed structure having a pitch (regular interval) d and a peak-valley quantity Δ (a differential quantity between peak and valley) formed on the surface of the transparent body.

As illustrated, light 2 incident on the diffraction lattice 1 is diffracted, and there occurs, as the transmitting light, a zero order transmissively diffracted light 3 and an N-order transmissively diffracted light 4, both of which transmit in the same direction as that of the incident light, while there also occurs, as the reflecting light, a zero order reflectively diffracted light 5 and an N order reflectively diffracted light 6, both of which are reflected in the positive reflecting direction with respect to the lattice surface. (Here, N is an arbitrary integer.)

Figure 2:
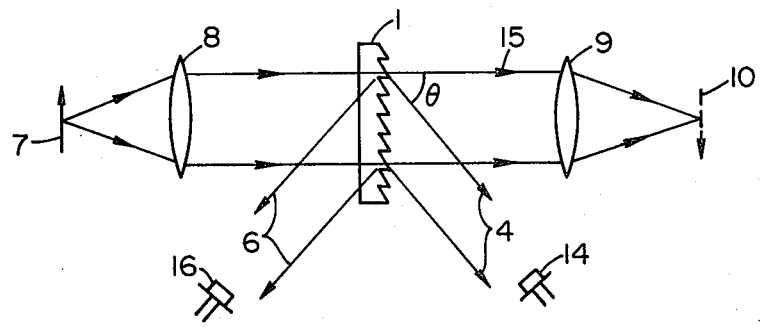
FIG. 2 is a schematic layout of a light metering device, in which a beam splitter of a relief type diffraction lattice is used.

FIG. 2 shows an embodiment, in wich the light metering is done by disposing the relief type diffraction lattice shown in FIG. 1 in the image forming optical system. The image forming optical system is to form an object image 10 of a photographic object 7 by means of lenses 8, 9. In the light path of this optical system, there is disposed a diffraction lattice 1. In the case of light metering using the N-order transmissively diffracted light 4, the light metering is done by a light detector 14, while, in the case of the light metering utilizing the N-order reflectively diffracted light 6, a light detector 16 is used for such light metering. Now, further explaining the former case as an example, the light detector should be disposed outside the image forming light path so as not to influence on the function of the image forming device, and also the diffracted light should be directed outside the lens 9.

In the following, the diffraction efficiency of the diffraction lattice shown in FIG. 1 is explained. In the diffraction lattice of FIG. 1, when the differential quantity Δ between the peak and valley is smaller than the pitch d an, approximate calculation of the diffraction efficiency $\eta_T(N)$ of the N-order transmissively diffracted light can be done, and the following equation is derived.

$$\eta_T(N) = (1 - R) \times \frac{\sin^2\left(N\pi - \frac{\alpha}{2}\right)}{\left(N\pi - \frac{\alpha}{2}\right)^2} \quad (2)$$

$$= (1 - R) \cdot \sin c^2\left(N\pi - \frac{\alpha}{2}\right)$$

$(N = 0, \pm 1, \pm 2 \ldots)$

Here $\alpha = 2\pi(n-1)\Delta/\lambda$ \quad (3)

R denotes a reflective index on the surface of the diffraction lattice, and, if $n=1.5$, $R=4\%$ or so. This is shown in FIG. 3.

Figure 3:
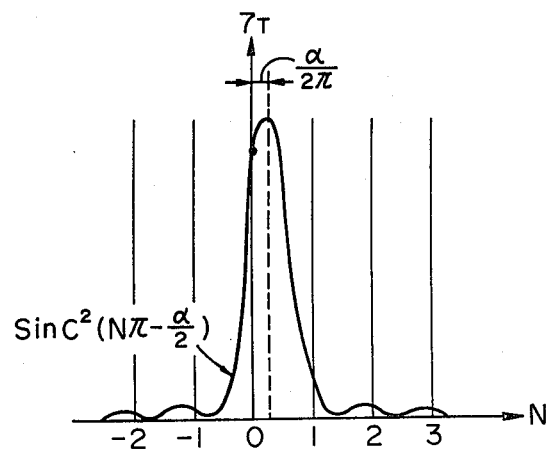
FIG. 3 is a graphical representation showing the transmissive diffraction efficiency of a relief type diffraction lattice.

In FIG. 3, the abscissa represents the diffraction order number N, and the ordinate denotes the diffraction efficiency $\eta_T$. The transmissive diffraction efficiency $\eta_T(N)$ of each order number is denoted by an intersection between a function represented by $(1-R)\times \sin c^2(N\pi - \alpha/2)$ transversely shifted by $\alpha/2\pi$ and a straight line represented by N=integer. Accordingly, each diffraction efficiency can be varied by controlling the phase difference $\alpha$.

If, in the device illustrated in FIG. 2, a fifth order transmissively diffracted light is used as the light beam for the light metering, the pitch d' of the diffraction lattice to be used for the beam splitter becomes $d'=5\lambda/\sin\theta$, which is five times as wide as $d=\lambda/\sin\theta$, a pitch of the diffraction lattice utilizing the primary order transmissively diffracted light, whereby the purpose of the present invention is met. However, as is understandable from FIG. 3, it is difficult to manufacture diffraction lattice which has the diffraction efficiency of a few percent for the fifth order transmissively diffracted light so as to have a sufficient quantity of light as the light metering beam, and the diffraction efficiency of nearly zero for the diffracted light of other order numbers, while maintaining 90% and above of the diffraction efficiency for the zero order transmissively diffracted light, regardless of to what value the phase difference $\alpha$ may be set.

Figure 4:
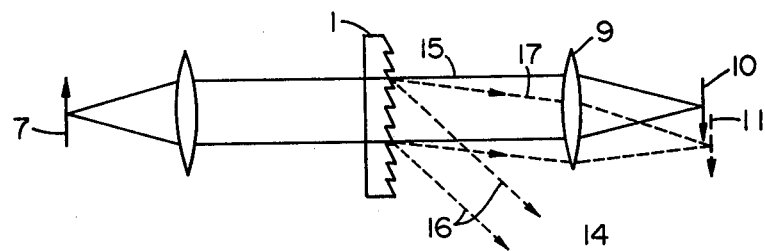
FIG. 4 is a schematic diagram for explaining harmful light which the beam splitter utilizing the diffraction lattice generates.

Here, explanations will be given in reference to FIG. 4 as to the harmfulness of the diffracted lights of order numbers other than the light metering diffracted light. In the illustration, the zero order transmissively diffracted light 15 and the light metering diffracted light 16 are projected from the diffraction lattice 1 disposed in the image forming light path. The zero order transmissively diffracted light 15 forms an object image 10 by the lens 9, while the light metering diffracted light 16 projects into the light detector 14. In case, however, the diffracted light of other order number, e.g., the diffracted light 17 of low order number, generates therefrom and projects into the lens 9, there is formed a ghost image 11 due to the diffracted light to detract from to the performance of the image forming optical system. Even when the diffracted light is of higher order number than the light metering diffracted light 16, it is turned into flare light, etc., which is not preferable.

So far, explanations have been given on the transmissively diffracted light, and the same thing can be said of the reflectively diffracted light. That is, the approximate equation of the diffraction efficiency $\eta_R(N)$ of the N-order reflectively diffracted light can be given as follows.

$$\eta_R(N) = R \times \frac{\sin^2(N\pi - \beta)}{(N\pi - \beta)^2} = R \times \sin c^2(N\pi - \beta) \quad (4)$$

Here, $\beta = 2\pi n\Delta/\lambda$ \quad (5)

From the above equation (4), therefore, in the relief type diffracting lattice, the maximum diffraction efficiency of the N-order reflectively diffracted light is obtained when $N\pi = \beta$, i.e., when $N\lambda = 2n\Delta$, hence the relief type diffraction lattice to be used for the beam splitter according to the present invention is so formed that it may substantially meet the abovementioned condition.

In this embodiment, a high order reflectively diffracted light is used as the light metering diffracted light with respect to the image forming zero order transmissively diffracted light. The beam splitter of this embodiment prevents development of the diffracted light other than the abovementioned diffracted light by use of the diffracting structure of a novel construction.

Figure 5:
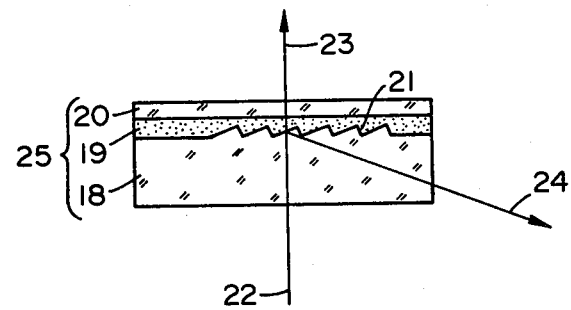
FIG. 5 is a cross-sectional view showing a first embodiment of a beam splitter according to the present invention.

Referring to FIG. 5 showing a first embodiment of the beam splitter according to the present invention, a reference numeral 18 designates an optically transparent substrate (e.g., acryl, polystyrene, polycarbonate, etc.) having a refractive index $n_1$, on the surface of which a relief type diffraction lattice is formed; a numeral 19 refers to a transparent layer of filling agent such as an adhesive agent (e.g., epoxy type adhesive agent) having a thickness sufficient to embed the relief type diffraction lattice and having the same refractive index as that of the substrate 18; a reference numeral 20 designates an optically transparent body composed of the same material as that of the transparent filling agent 19, which is combined with the transparent substrate as an optically integral part through the filling (or adhesive) agent layer 19. These three layers 18, 19 and 20 constitute a beam splitter 25. The surface of the relief type diffraction lattice on the transparent substrate 18 is deposited with a dielectric film consisting of silicon oxide, titanium oxide, etc., thereby forming a reflective coating 21 having a certain designed reflective power.

Figure 6:
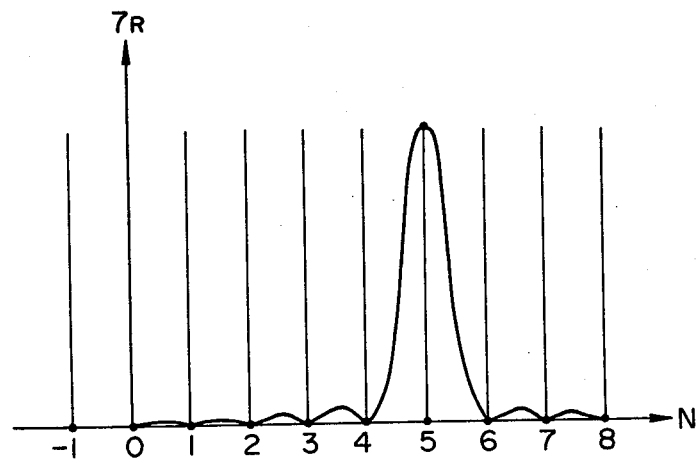
FIG. 6 is a graphical representation showing the reflective diffraction efficiency of the first embodiment of a beam splitter according to the present invention.

Let us now consider a case, wherein light beam 22 from an object is projected into this beam splitter 25. One part of the incident light 22 is reflected by the reflective coating 21 on the surface of the relief type diffraction lattice, and the remaining part transmits through the beam splitter. The light beam reflected by the reflective coating 21 is subjected to a phase difference due to the irregular (peak and valley) structure of the reflective coating 21, whereby a reflectively diffracted light 24 occurs. The reflective diffraction efficiency in this case is given by the foregoing equations (4) and (5), provided that R in the equation (4) is the reflective power of the reflective coating 21. In order that the zero order transmitting light may be maintained higher than 90%, the reflective power R should preferably be 10% or below, as mentioned in the foregoing. When the fifth order reflectively diffracted light is used as the light metering light beam, the quantity of irregularity (peak-and-valley) is so determined that the phase difference may be $\beta = 5\pi$, thus determining the diffraction lattice surface. In this instance, the reflected light from the diffraction lattice contains only the fifth order reflectively diffracted light 24, and does not contain the reflectively diffracted light of other order numbers. This is shown in FIG. 6. The diffraction efficiency of this fifth order reflectively diffracted light 24 is represented as $\eta_R(5)=R$ from the equation (4), so that a light metering light beam of a desired intensity can be obtained by appropriately determining the reflective power of the reflective coating 21. Since the light metering light beam is the fifth order diffracted light, the diffraction lattice to be used for the beam splitter may have a pitch of five times as mild as that in the diffraction lattice where the primary order diffracted light is utilized.

As for the transmitting light, the light beam 22 projected into the beam splitter 25 in FIG. 5 passes through the beam splitter 25, with the exception of the light of $(1-R)\%$ other than the abovementioned reflectively diffracted light, provided that there is no loss in the medium or reflection by a plane other than the reflective coating 21. In this beam splitter, since the refractive index of the transparent substrate 18 and that of the transparent filling agent layer 19 are the same, no phase difference occurs in the transmitting light due to the construction of the relief type diffraction lattice, hence no diffracted light is generated other than the zero order. In this consequence, substantially all of the transmitting light becomes the zero order transmissively diffracted light for image formation.

Figure 7A:
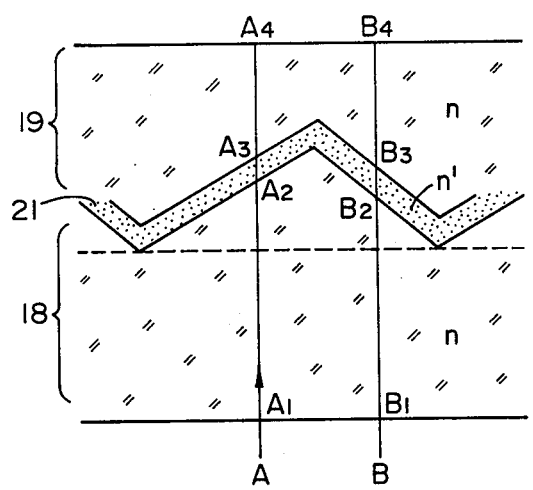
FIGS. 7A and 7B are schematic diagrams for explaining the transmissively diffracted light through the first embodiment of the beam splitter.

In order to further study this point in more detail, let us now consider the phase difference within one lattice line of a general relief type diffraction lattice as shown in FIG. 7A. In the drawing, the average refractive index of the reflective coating 21 is $n'$ and the refractive index of the transparent substrate 18 and the transparent filling agent layer 19 is n, respectively.

Differences in the light paths at every location in one lattice line, when the horizontal wave of a wave length $\lambda$ vertically projects into the diffraction lattice, will be found out as follows.

The light path lengths of a light beam passing through a light path A and a light beam passing through a light path B are respectively represented as follows:

$n(\overline{A_1A_2}+\overline{A_3A_4})+n'\overline{A_2A_3}$ and
$n(\overline{B_1B_2}+\overline{B_3B_4})+n'\overline{B_2B_3}$.

Since $\overline{A_1A_4}=\overline{B_1B_4}$, a difference L of the light path lengths of these two light beams is expressed as $L=(n-n')(\overline{A_2A_3}-\overline{B_2B_3})$. Accordingly, the phase difference $\alpha$ is represented as:

$$\alpha = \frac{2\pi}{\lambda} L = \frac{2\pi}{\lambda} (n - n')(\overline{A_2A_3} - \overline{B_2B_3}).$$

However, usually, $A_2A_3 \approx B_2B_3$ and $n \approx n'$, hence the value of $\alpha$ is very small. On account of this, there is in the transmitting light very little phase difference due to the structure of the relief type diffraction lattice, and most of the light transmitted is zero order transmitting light.

Figure 7B:
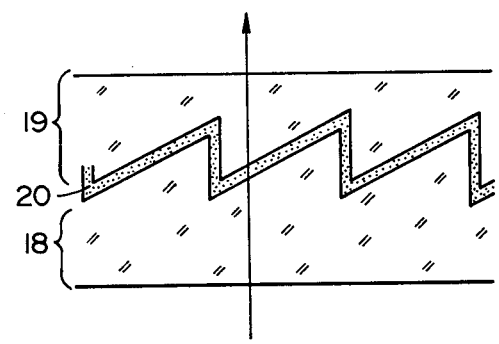

Particularly, in the case of the blazed type diffraction lattice, the structure is as shown in FIG. 7B, and the phase difference possibly occurs in the vicinity of the right angle part of the triangular shape. However, since the light quantity incident on this portion is far less than the light quantity at the portion where no phase difference exists, the diffracted light generated having this phase difference is also less, hence most of the light generated is zero order transmitting light.

As seen from one above, according to the embodiment of the present invention, there can only be obtained both high order reflectively diffracted light necessary for light metering and zero order transmissively diffracted light necessary for image formation, and no unnecessary diffracted lights of other order numbers are generated. The ration of diffraction efficiency of these two diffracted lights can be controlled by appropriately establishing the reflective power of the reflective coating 21.

Figure 8:
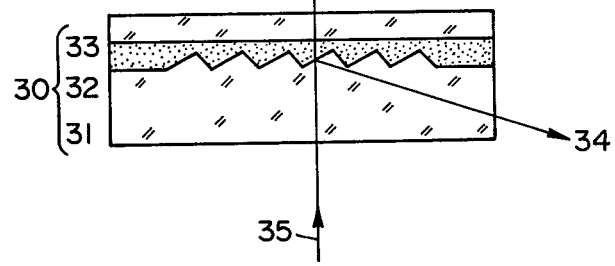
FIG. 8 is a cross-sectional view of a second embodiment of a beam splitter according to the present invention.

FIG. 8 shows a second embodiment of the present invention, in which a reference numeral 31 designates an optically transparent substrate having a refractive index $n_1$ (e.g., acryl, polystyrene, polycarbonate, etc.) with a relief type diffraction lattice formed on its surface; a numeral 32 refers to a layer of an adhesive agent having a refractive index $n_2$; and a numeral 33 denotes an optically transparent body composed of the same material as the optically transparent substrate 31. Both transparent layers 31 and 33 are combined together through the layer of adhesive agent 32 to constitute the beam splitter 30. The layer of adhesive agent 32 has a thickness sufficient to flatten the irregular (peak-and-valley) structure of the relief type diffraction lattice formed on the surface of the transparent substrate 31.

The difference between this second embodiment and the first one shown in FIG. 5 is that the reflective coating is removed, and, instead, the refractive index $n_2$ of the adhesive agent layer 32 is made slightly different from the refractive index $n_1$ of the transparent substrate 31.

Let us now consider the diffracted light by both transmission and reflection, when the light beam 35 from the object has been projected into the beam splitter of the above-described construction. If $n_1=n_2$, the irregular (peak-and-valley) structure on the surface of the transparent substrate does not exist at all, hence no reflectively diffracted light 34 is generated and the entire light beam transmits through the beam splitter.

In the case of $n_2 \neq n_1$, there occurs a reflected light at the interface between the transparent substrate 31 and the transparent member 32 due to difference in their refractive index, whereby a reflectively diffracted light 34 is generated. As was the case with the first embodiment, when the differential (peak-and-valley) quantity $\Delta$ of the diffraction lattice is so set that the phase difference becomes $\beta=5\pi$, there is generated only the fifth order reflectively diffracted light, the diffraction efficiency of which will be the reflective power R to be determined by a difference between the refractive index of the transparent member and that of the adhesive layer, i.e., $(n_1-n_2)$.

As to the transmissively diffracted light, the present embodiment, unlike the first embodiment, generates transmissively diffracted light other than zero order. In other words, since the difference between the refractive index of the transparent body and that of the adhesive layer is not zero, the transmitting light has the following phase difference.

$$\alpha=2\pi(n_1-n_2)\Delta/\lambda \tag{6}$$

Accordingly, as shown in FIG. 3, the function $\eta_T(N)$ shifts laterally to produce transmissively diffracted light other than zero order. In this embodiment, however, since the refractive index difference $(n_1-n_2)$ is small, the phase difference α is also small accordingly, hence the transmissive diffraction efficiency other than the zero order is negligible.

In this manner, the light metering can be done by disposing the light detector so that it may receive the reflectively diffracted light obtained from the beam splitter in the first and second embodiments. In this instance, the light quantity to be split for the light metering can be varied by changing the reflective power on the surface of the relief type diffraction lattice, whereby a quantity of diffracted light for light metering suitable for every light metering system can be taken out.

Figure 9:
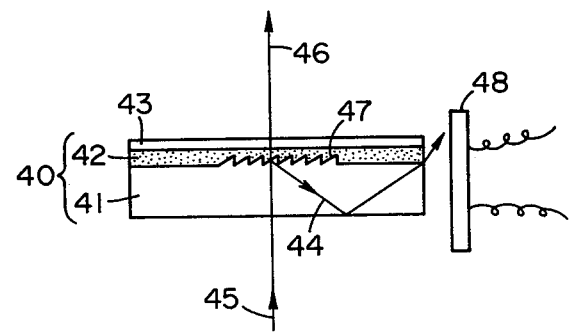
FIG. 9 is a cross-sectional view of the device for detecting a portion of incident light, which utilizes the split light by the principle of total reflection.

FIG. 9 illustrates a beam splitter which is very useful for taking out the split beam. The beam splitter in this embodiment has high utility in the light metering device. In this beam splitter, the reflectively diffracted light 44 which has been split for the light metering is led into the light detector 48, while it is being totally reflected by the inner surface of the transparent substrate 41. Accordingly, the angle of diffraction of the reflectively diffracted light is determined from the conditions, under which the total reflection takes place.

Since the beam splitter utilizing such total reflection combines together the light transmission member and the diffraction lattice, it is extremely advantageous in disposing the same within the optical device.

In the following, an effective shape of relief for the beam splitter will be described. From the standpoint of the light metering efficiency, the blazed diffraction lattice is desirable as the effective relief type diffraction lattice. Also, where it is used for the light metering in a single lens reflex camera, etc., it is desirable from the aspect of the chromatic characteristics that all the lights of wavelengths corresponding to the visible lights of red, green, and blue be led into the light detector. Further, in this case, the angles of diffraction of reflectively diffracted lights for the light metering should desirably be the same in substance.

Furthermore, when the beam splitter is disposed in the vicinity of the focal plane, as will be described later, it is desirable that the diffraction lattice structure be sufficiently fine to the extent that it is not so noticeable to the photographer's eye as to impair the sight of the image on the focal plane.

In the following, an embodiment of rectifying the color dispersion of the reflectively diffracted light to be used for the light metering will be described. In the light metering by the photographic camera, it is desirable that the red, green, and blue lights be equally metered, for which purpose the reflectively diffracted light of each color should desirably be diffracted in the same direction. When the wavelengths representing red, green, and blue lights necessary for the light metering are represented by $\lambda_R$, $\lambda_G$, and $\lambda_B$, the following diffraction equation within a medium having the refractive index n is established.

$$n \cdot d \cdot \sin \theta = N\lambda \quad (7)$$

From the above equation (7), when the following relationship is established, $$\sin \theta = NR \frac{\lambda_R}{n \cdot d} = NG \frac{\lambda_G}{nd} = NB \frac{\lambda_B}{nd}$$

(where: Ni (i=R·G·B) is an integer) the angle of diffraction of the diffracted lights of the $N_R$, $N_G$, and $N_B$ orders at the respective wavelengths becomes equal. Also, the reflective diffraction efficiency becomes maximum when the following relationship is established from the equation (4):

$$N = \frac{\beta}{\pi} = \frac{2n\Delta}{\lambda}$$

(N is an integer), from which N·λ=2nΔ. Accordingly, when $N_B\lambda_R = N_G\lambda_G = N_B\lambda_B = 2n\Delta$, the maximum diffraction efficiency is obtained for each wavelength, and the diffracting angles coincide. Since each of Ni (i=R·G·B) should actually be an integer, the above expressed equation cannot be perfectly satisfied in most cases, but the diffraction lattice can be designed in such a manner that each Niλi (i=R·G·B) may be substantially equal.

Figure 10:
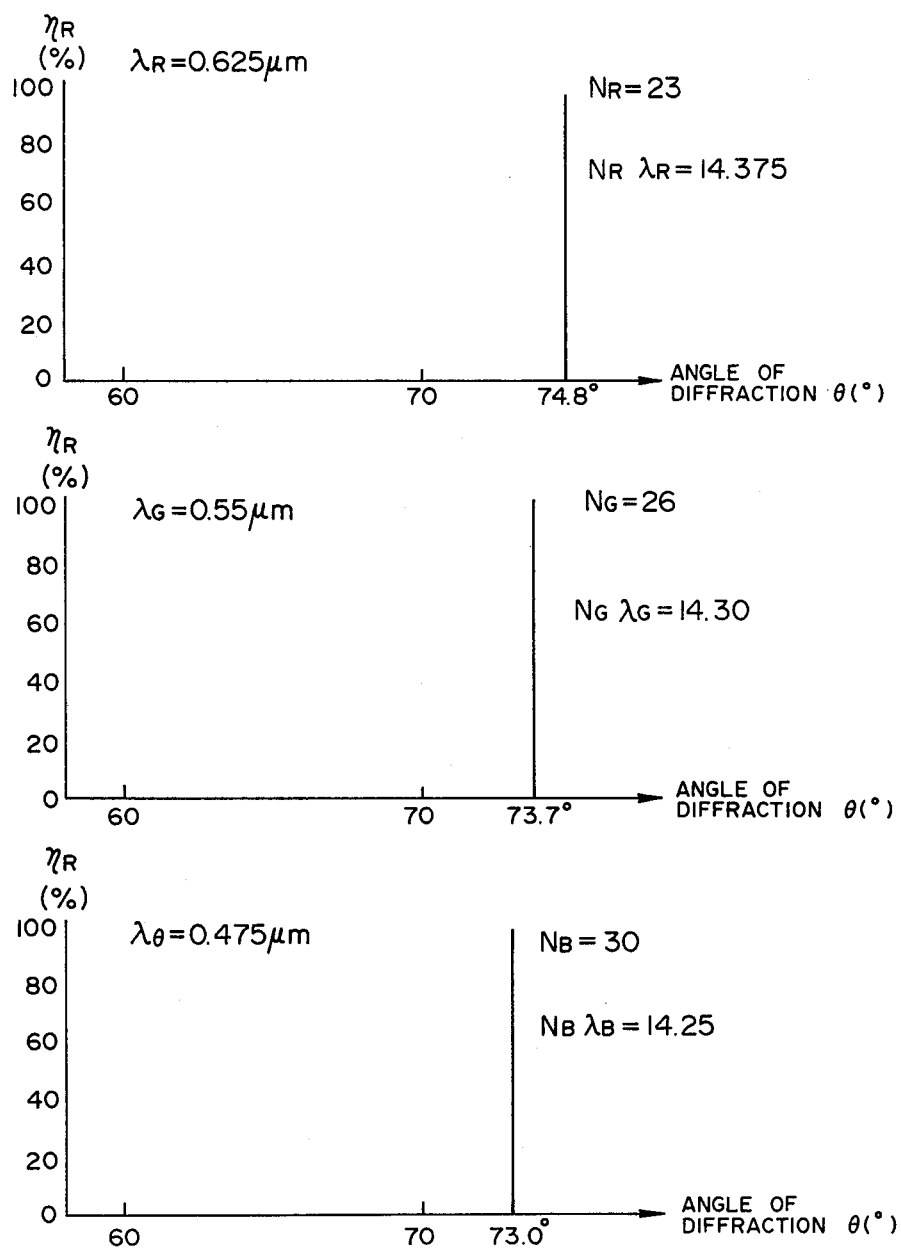
FIG. 10 shows graphical representations of the diffraction efficiencies of the embodiments of the beam splitter, in which the color characteristic of the split light has been improved.

Showing examples of designing such diffraction lattice, the refractive index of the diffraction lattice member is set at 1.49 with the pitch d=10 μm and the differential quantity Δ=4.80 μm. Further, the wavelength for each color is set $\lambda_R$=0.625 μm, $\lambda_G$=0.55 μm, and $\lambda_B$=0.475 μm, the value of which is standardized for each wavelength to find out the diffraction efficiency $\eta_R$/R. FIG. 10 shows the results.

Figure 11:
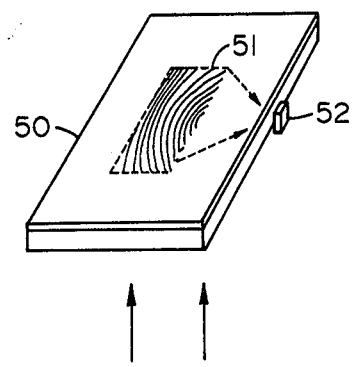
FIG. 11 is a perspective view showing a device provided with the relief type diffraction lattice, in which the split light has a condensing characteristic.

As seen from FIG. 10, each Niλi (i=R·G·B) is substantially 14.3, and the angle of diffraction showing the maximum diffraction efficiency at each wavelength is substantially coincided at 73° to 74°. Furthermore, the beam splitter of the present invention can be given a light collecting function so that light may be effectively collected on the light detector having a light receiving element of a small surface such as silicon light detector. When the lattice lines are inscribed concentrically on the beam splitter with the light detector as the center, as shown in FIG. 11, the diffracted light can be collected on the light detector, whereby the light metering light beam can be used effectively. FIG. 11 illustrates the embodiment. In the drawing, a reference numeral 50 designates the beam splitter, 51 a concentric diffraction lattice, and 52 the light detector. Also, since the quantity of the split light to the light detector can be controlled by the reflective power of the reflective coating on the relief type diffraction lattice, the metered light distribution can be controlled when this reflective power is varied depending on location. Moreover, when different structures of the diffraction lattice are provided in one beam splitter depending on regions to be distinguished, and the light detectors are provided to receive each of the diffracted lights, each region can be individually light-metered with each of the light detectors.

Figure 12:
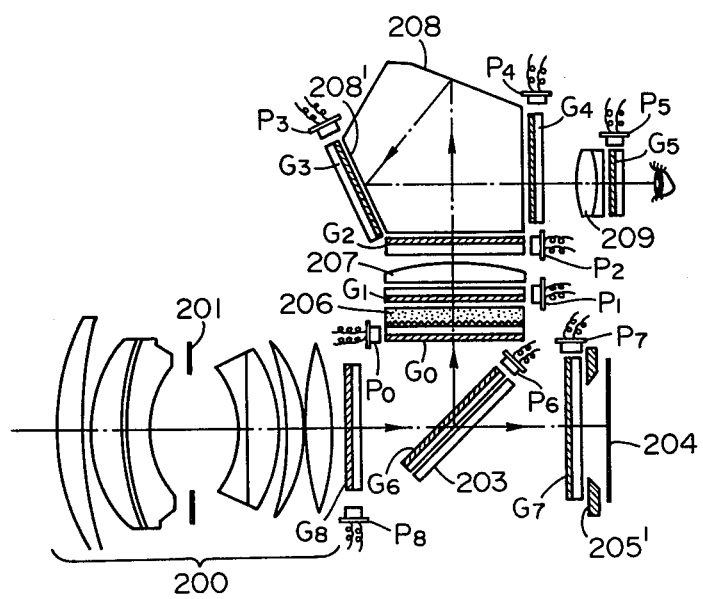
FIG. 12 is a cross-sectional view of a single lens reflex camera, in which a device according to the present invention is incorporated.

FIG. 12 shows one embodiment, wherein the beam splitter of the afore-described construction has been incorporated in the light metering device of a single lens reflex camera. In the drawing, a numeral 200 refers to a photo-taking lens, 201 denotes an aperture, 203 designates a mirror, 204 an image plane, 205 a shutter, 206 a focusing plate, 207 a condenser lens, 208 a pentagonal prism, and 209 an eye-piece lens. In most cases, the lower surface of the focusing plate 206 constitutes a dispersing plate and the upper surface thereof constitutes a Fresnel lens. Also, a reference letter G represents a beam splitter, and P a light receiving element.

In the illustrated construction, the beam splitter $G_0$ is interposed between the focusing plate 206 and the quick-return mirror 203, while the light receiving element $P_0$ is provided facing one end surface of the beam splitter $G_0$. In this layout, the light image from an object enters into the beam splitter $G_0$ after it has been reflected by the mirror 203. This light is split by the beam splitter, and one part thereof propagates within the beam splitter $G_0$, while it is being totally reflected, and enters into the light receiving element $P_0$. Also, the transmitting light, after its passage through the beam splitter, focuses on the focusing plate 206, and is used for verifying the focus. In the second layout, the beam splitter $G_1$ is interposed between the focusing plate 206 and the condenser lens 207, while the light receiving element $P_1$ is provided in confrontation to one end surface of the beam splitter $G_1$. In this layout, the light from an object passes through the photo-taking lens 200, is reflected by the mirror 203, and scattered by the focusing plate 206. At the time of passage of this scattered light beam through the beam splitter $G_1$, a part of the light beam travels through the interior of the beam splitter $G_1$ by total reflection, or it propagates along the diffraction lattice and enters into the light receiving element $P_1$.

The third example of the layout is such that the beam splitter $G_2$ is interposed between the condenser lens 207 and the pentagonal prism 208, and the light receiving element $P_2$ is provided in confrontation to one end surface of the beam splitter. In this case, light metering is carried out by using a part of the light beam after it has passed through the condenser lens.

The fourth example of the layout is such that the beam splitter $G_3$ is provided in front of the front reflecting surface of the pentagonal prism 208, and the light receiving element $P_3$ is provided in confrontation to one end surface of the beam splitter. Here, the light beam used for the light metering is the light beam striking surface 208', from which an effective light beam for the view finder has been removed.

The fifth layout is such that the beam splitter $G_4$ is interposed between the pentagonal prism 208 and the eye-piece lens 209, and the light receiving element $P_4$ is provided in confrontation to one end surface of the beam splitter.

The sixth layout is such that the beam splitter $G_5$ is provided behind the eye-piece 209, and the light receiving element $P_5$ is provided facing one end surface of the beam splitter.

The seventh layout is such that the beam splitter $G_6$ is provided on the reflecting surface of the mirror 203, and the light receiving element $P_6$ is disposed at such a position that it may confront to one end surface of the beam splitter when the mirror 203 is in its slant position. In this case, since the beam splitter $G_6$ oscillates together with the mirror 203, it is made of a material as light in weight as possible. Incidentally, the mirror may be a slanted fixed half mirror.

The eighth layout is such that the beam splitter $G_7$ is provided in front of the image plane 204, and the light receiving element $P_7$ is provided in confrontation to one end surface of the beam splitter. In this case, the light metering can be done even during the exposure operation of the film.

The ninth layout is such that the beam splitter $G_8$ is provided just behind the photo-taking lens 200, and the light receiving element $P_8$ is provided in confrontation to one end surface of the beam splitter. In this instance, the light beam used for the light metering is the image forming light beam after its passage through the photo-taking lens. In such layout, since the beam splitter is provided in front of the quick-return mirror, the light metering is possible, even when the quick-return mirror is up at the time of the photographic operation. On account of this, it becomes possible to conduct a special light metering operation such that outputs from the light detector are integrated at the time of flash photographic operation, and, when the integrated output reaches an appropriate value, the flash photography is terminated. Also, the beam splitter according to the present invention is free from undesirable characteristics such as angle selection characteristics, etc. as in the case of a volumetric type diffraction lattice, whereby accurate light metering is always warranted, even at the time of apertured light metering.

Figure 13A:
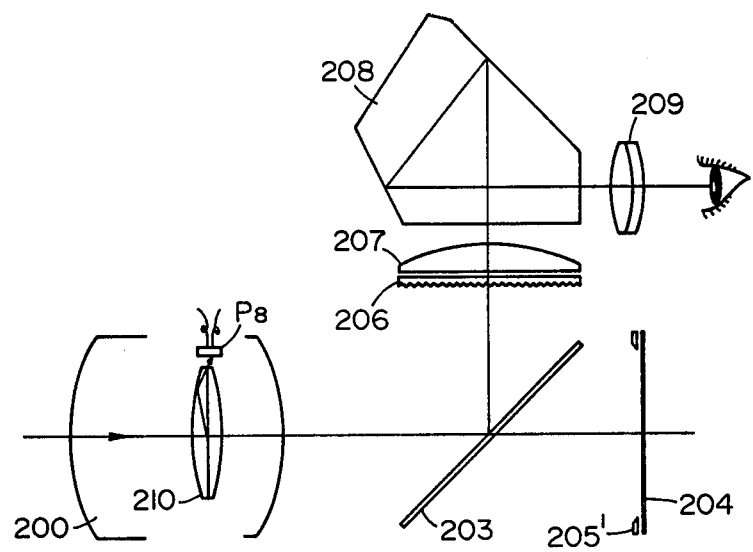
FIG. 13A is a schematic cross-sectional view of a single lens reflex camera, in which a device according to the present invention having a lens function is incorporated.
Figure 13B:
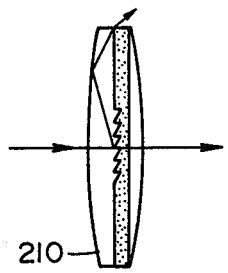
FIG. 13B is a cross-sectional view of a lens employed in FIG. 13A.

FIG. 13A illustrates still another embodiment of the present invention, in which a reference numeral 210 designates a plastic lens of relatively low power having the beam splitter within it. This lens constitutes a part of the photo-taking lens group 200. FIG. 13B is an enlarged view of the plastic lens 210 shown in FIG. 13A. The beam splitter is formed in the substantially same way as that in FIG. 9, a point of difference of which resides in that the beam splitter is embedded in the interior of the plastic lens.

While various layouts may be contemplated as described in the foregoing, there is such a problem that, when the beam splitter of such construction is disposed in the vicinity of the focusing plate, if the diffractive structure and the reflective coating are formed only in the region corresponding to a part of the image plane, the surrounding area of this region will appear dark in comparison with the neighboring area due to a decrease in the light quantity for the view finder. Such a phenomenon may be convenient for the partial light metering, because this represents the light metering region. However, in the case of the average light metering, this adversely affects the measurement. In such a case, the reflective coating is formed over the entire region corresponding to the image plane as a whole, whereby darkening of only a part of the image plane can be avoided, although the entire image plane becomes dark.

Figure 14:
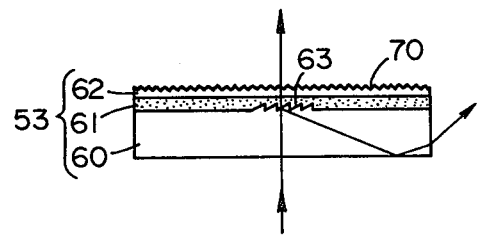
FIG. 14 is a cross-sectional view of the present invention having the function of a focusing plate.

Moreover, the beam splitter according to the present invention can use a plastic material as the optically transparent total reflection member. It is also possible to form the beam splitter integrally with the focusing plate as shown in FIG. 14. In the drawing, a reference numeral 60 designates an optically transparent substrate with the relief type diffraction lattice 63 being formed on its one surface; a numeral 61 refers to an adhesive agent layer having the same refractive index as that of the transparent substrate 60; and 62 denotes an optically transparent body, the surface of which constitutes the focusing plate. These three layers are optically integrated to form the beam splitter.

Accordingly, when such beam splitter is provided at the focusing plate in FIG. 12, size-reduction in the device becomes possible. In a single lens reflex camera of recent model, a Fresnel lens is used as the condenser lens. In this case, a Moiré pattern develops due to periodicity of the diffraction structure which the beam splitter possesses as well as the periodic structure of the Fresnel lens. In order to prevent such a Moiré0 pattern, the Fresnel lens and the beam splitter are separated at a certain definite distance so that the contrast due to the Moiré pattern is suppressed to where it may not be observed with bare eyes.

As mentioned in the foregoing, the beam splitter of the present invention, when used in the light metering device of the photographic camera, is disposed in the image forming light beam to split the light metering light beam. At the same time, its influence on the transmitting image forming light beam is small, so that the image forming capability of the object lens is hardly impaired.

In the foregoing explanations, a case of splitting the high order diffracted light for the light metering purpose has been taken up in the main. However, it may also be feasible that the primary order diffracted light may be utilized without use of the particularly high order diffracted light. In this instance, the diffraction lattice to be used as the diffracting element within the beam splitter should be of fine in pitch. However, unlike the beam splitter using the conventional diffraction lattice, the beam splitter of the present invention does not generate any unnecessary diffracted light in the transmitting light beam, hence much more light can be used as the zero order transmitting light, and the advantage of high utility of the image forming light beam is in no way sacrificed.

The relief type diffraction structure to be used for the beam splitter of the present invention can be mechanically formed by inscribing grooves on a metal with a diamond blade at a certain regular interval, as is the case with manufacturing ordinary Fresnel lens or a spectroscopic diffraction lattice. From the metal mold thus manufactured, plastic copies can be produced on an industrialized mass-production scale by compression molding, etc., hence the cost advantage is also great.

It is also possible that, after development, the relief type diffraction lattice or blazed diffraction lattice can be obtained by recording an interference pattern on a photoresist using the holographic technique. Onto this photoresist, a thin gold coating is evaporatively deposited, and a nickel mold can be produced by an electric molding method, from which the plastic copies can be mass-produced.

Thus, the beam splitter to be used for the device of the present invention is of such a construction that the relief type diffraction lattice, in which the high order diffracted light is particularly intense, is formed on one surface of the transparent substrate, then the reflecting surface of a predetermined reflective power is provided on its surface, and the transparent filling agent layer having substantially the same refractive index as that of the above-mentioned transparent substrate is coated on the diffraction grating to perfectly fill up the same. Such a beam splitter is capable of producing arbitrarily the high order diffracted light, and does not develop harmful light other than the desired split light by not imparting any phase difference to the light passing through the reflecting surface, and, in addition, can utilize the diffraction grating of comparatively mild pitch, on account of which its mass-productivity is also excellent.

What I claim is:

1. A device for detecting a portion of light incident of an image forming optical system, comprising:
   (a) a first transparent member having a refractive index n and having a relief type diffraction lattice of a fine pitch with a peak-to-valley difference formed on one surface thereof, said relief type diffraction lattice substantially satisfying the condition $N\lambda = 2n\Delta$;
   (b) a reflective coating provided on the surface of said relief type diffraction lattice;
   (c) a second transparent member having substantially the same refractive index as that of said first transparent member, said second transparent member completely fills up the difference between the peak-to-valley in said relief type diffraction lattice; and
   (d) a light detector for detecting the diffracted light from said relief type diffraction lattice.

2. A device according to claim 1, wherein the pitch d of said relief type diffraction lattice is so selected that the diffracting angle $\theta$ of an N-order diffracted light to be determined by the diffraction condition of $n \cdot d \cdot \sin \theta = N\lambda$ satisfies the total reflection condition on the other surface of said first transparent member.

3. A device according to claim 1, wherein the lattice lines of said relief type diffraction lattice are concentric to enable the diffracted light to be converged on said light detector.

4. A device for detecting a portion of incident light, comprising:
   an image forming optical system for defining an optical path;
   a relief diffraction lattice formed in a transparent body and disposed in said optical path of said image forming optical system, said diffraction lattice and being blazed to provide reflectively diffracted light of a specific Nth order wherein N is substantially not less than 2; and
   light detecting means for detecting said Nth order reflectively diffracted light from said diffraction lattice.

5. A device according to claim 4, wherein the incident light is a multicolor light beam including wavelengths $\lambda_R$, $\lambda_G$, $\lambda_B$ representing red, green and blue lights, respectively, and with the blazed order corresponding to these wavelengths denoted as $N_R$, $N_G$ and $N_B$, all of which are integers greater than or equal to 2, $N_R\lambda_R = N_G\lambda_G = N_B\lambda_B$ is satisfied.

6. A device according to claim 4, wherein said transparent body is a plane plate having parallel surfaces with said N order reflectively diffracted light being totally reflected by an inner surface of the transparent body and being led to said light detecting means.

7. A device according to claim 4, wherein the lattice lines of said relief type diffraction lattice are concentric so that the diffracted light is converged on said light detecting means.

8. A device according to claim 4, wherein said transparent body includes:
   (a) a first transparent member having a refractive index and having a relief type diffraction lattice formed on one surface thereof;
   (b) a reflective coating provided on the one surface of said relief type diffraction lattice; and
   (c) a second transparent member having substantially the same refractive index as that of said first transparent member, said second transparent member completely filling up the space between adjacent peaks in said relief type diffraction lattice.

* * * * *

UNITED STATES PATENT AND TRADEMARK OFFICE
CERTIFICATE OF CORRECTION

PATENT NO. : 4,484,072  Page 1 of 2
DATED : November 20, 1984
INVENTOR(S) : SUSUMU MATSUMURA It is certified that error appears in the above-identified patent and that said Letters Patent is hereby corrected as shown below:

Column 1, line 60, after "light" insert --is available--.

Column 4, line 47, "wich" should read --which--;
          line 68, "d an," should read --d, an--.

Column 5, lines 38,39, after "manufacture" insert --a--;
          line 61, delete "to" (third occurrence).

Column 8, line 3, "one above" should read --the above--;
                  "the embodiment" should read --one embodiment--;
          line 9, "ration" should read --ratio--.

Column 10, line 9, "$N_B\lambda_R$" should read --$N_R\lambda_R$--.

Column 12, line 61, "Moire0" should read --Moiré--.

Column 13, line 13, delete "of".

UNITED STATES PATENT AND TRADEMARK OFFICE
CERTIFICATE OF CORRECTION

PATENT NO. : 4,484,072

DATED : November 20, 1984

INVENTOR(S) : SUSUMU MATSUMURA

It is certified that error appears in the above-identified patent and that said Letters Patent is hereby corrected as shown below:

Column 13, line 59, Claim 1, "of" (second occurrence) should read --on--;
line 63, Claim 1, after "difference" insert --$\Delta$--.

Signed and Sealed this

Twenty-fourth Day of December 1985

[SEAL]

Attest:

DONALD J. QUIGG

Attesting Officer

Commissioner of Patents and Trademarks